(12) United States Patent
Williams et al.

(10) Patent No.: US 8,345,828 B2
(45) Date of Patent: Jan. 1, 2013

(54) SYSTEM AND METHOD FOR POOLED IP RECORDING

(75) Inventors: Jamie Richard Williams, Fleet (GB); Damian Smith, Epsom (GB); Marc Calahan, Woodstock, GA (US); Mark Goodall, Chichester (GB)

(73) Assignee: Verint Americas, Inc., Roswell, GA (US)

(\*) Notice: Subject to any disclaimer, the term of this patent is extended or adjusted under 35 U.S.C. 154(b) by 715 days.

(21) Appl. No.: 12/416,906

(22) Filed: Apr. 1, 2009

(65) Prior Publication Data

US 2009/0290687 A1 Nov. 26, 2009

Related U.S. Application Data

(60) Provisional application No. 61/041,249, filed on Apr. 1, 2008.

(51) Int. Cl.
*H04M 1/64* (2006.01)
(52) U.S. Cl. ............... 379/68; 379/88.19; 379/88.21; 379/73; 379/83
(58) Field of Classification Search ............ 379/68, 379/88.01, 114.2, 265.11, 266.01, 32.05, 379/37, 88.21, 207.02, 265.01, 142.06, 73, 74, 83, 85, 88.12, 88.13, 88.19, 88.2, 88.25, 88.27
See application file for complete search history.

(56) References Cited

U.S. PATENT DOCUMENTS

| | | | |
|---|---|---|---|
| 2004/0208186 A1* | 10/2004 | Eichen et al. | 370/401 |
| 2007/0153820 A1* | 7/2007 | Gould | 370/432 |
| 2007/0263785 A1* | 11/2007 | Williams et al. | 379/67.1 |
| 2008/0069311 A1* | 3/2008 | Mercuriali | 379/85 |
| 2008/0080483 A1* | 4/2008 | Calahan et al. | 370/352 |

\* cited by examiner

*Primary Examiner* — Xu Mei
*Assistant Examiner* — Leshui Zhang
(74) *Attorney, Agent, or Firm* — Meunier Carlin & Curfman

(57) ABSTRACT

Embodiments of the present invention provides systems and methods for pooled IP recording. An exemplary method of the present invention comprises monitoring a user's logon, associating a communication device to the user, assigning an interface to a recorder associated with the communication device, and recording data from the communication device sent over the interface. Another exemplary method of the present invention comprises detecting a recorder failure and dynamically routing an interface associated with the failed recorder to at least one other recorder.

20 Claims, 11 Drawing Sheets

SYSTEM AND METHOD FOR POOLED IP RECORDING

CROSS-REFERENCE TO RELATED APPLICATION

This application claims priority to U.S. provisional patent application No. 61/041,249 filed on Apr. 1, 2008, which is incorporated by reference herein in its entirety.

BACKGROUND OF THE INVENTION

I. Field of the Invention

The present invention is generally related to recording media communications and, more particularly, is related to systems and methods for recording IP communication.

II. Description of Background Art

Time Division Multiplexing (TDM) networks have historically provided communications functionality to call centers and customers. However, the introduction of Voice over Internet Protocol (VoIP) networks and similar technologies have provided the opportunity for call centers to expand services to customers, such as recording of incoming and outgoing communications, and monitoring the recorded communications. While the utilization of VoIP networks has expanded the capabilities for call centers, VoIP may utilize protocols and technologies that have not historically been utilized.

In an Internet Protocol (IP) communication network, any of a plurality of communication devices may be configured to send data to and receive data from other communication devices. Users of the communication devices, network administrators, and/or third parties may desire to record the data communicated to and/or from a particular communication device.

Traditionally, the voice recording interface to a telephone switch used in certain business systems was based on TDM PCM32 channel trunks actively sending data to the recorder over a dedicated connection. Thus, such systems were constrained to record all audio channels. Rather than use a general purpose computer network, the systems used many, hard-wired, physical connections between the telephone switch and each recorder channel. Audio could not be redirected between recorders because of the channel audio hardwiring, so reduced recording channel counts, load balancing and redundancy could not easily be implemented.

SUMMARY OF THE INVENTION

In this regard, systems and methods for selectively recording IP telephony are provided. An exemplary embodiment of such a system comprises: detecting a user logon; associating a communication device with the user; assigning an interface grouping that may comprise of one or more RTP streams to a recorder associated the communication device; and recording data from the communication device, wherein the data is transmitted over the interface to the recorder.

An advantage of the present invention is the reduction of the hardware necessary to record user communication stations. In an embodiment, the recording system only records users when they are logged on to the system. It does this by dynamically managing and routing audio over a computer network to available recording channels. Hence, the total number of recording channels can be shared since users are not all logged on at the same time.

In another embodiment, the recording system allows call audio on a computer network to be routed and recorded under software control. This differs from prior technology, which hardwires the telephony switch and hence call audio to specific recorder channels.

One benefit of the invention is that less recorder channels are required, since they are not all connected and in use at once. This means that less recorder hosts are required, saving building space. In addition, if a recorder fails, different recorders can be instructed to record the same audio, providing a simple implementation of fault tolerance. If a recorder fails the system is designed with enough capacity to allow the remaining recorders to absorb the failed recorder's load (N+1). If two or more recorders fail, the system can be designed to support multiple recorder failures (N+M). The same principle applies to load balancing, where channels are assigned based on how busy each recorder is so that the recorders are substantially evenly balanced. If a recorder reports that it is extremely busy, the recorder controller can instruct another recorder to record the audio instead.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

Many aspects of the disclosure can be better understood with reference to the following drawings. The components in the drawings are not necessarily scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications and equivalents.

DETAILED DESCRIPTION OF THE INVENTION

A preferred embodiment of the present invention is now described with reference to the figures where like reference numbers indicate identical or functionally similar elements. Also in the figures, the left-most digit(s) of each reference number corresponds to the figure in which the reference number is first used.

Disclosed herein are systems and methods for a pooled IP recording. In particular, the recording can be achieved using a telephone switch configuration and a recorder controller.

Exemplary systems are first discussed with reference to the figures. Although these systems are described in detail, they are provided for purposes of illustration only and various modifications are feasible. After the exemplary systems are described, examples of flow diagrams and a sequence diagram of the systems are provided to explain the manner in which the communication signals can be recorded.

Figure 1A:
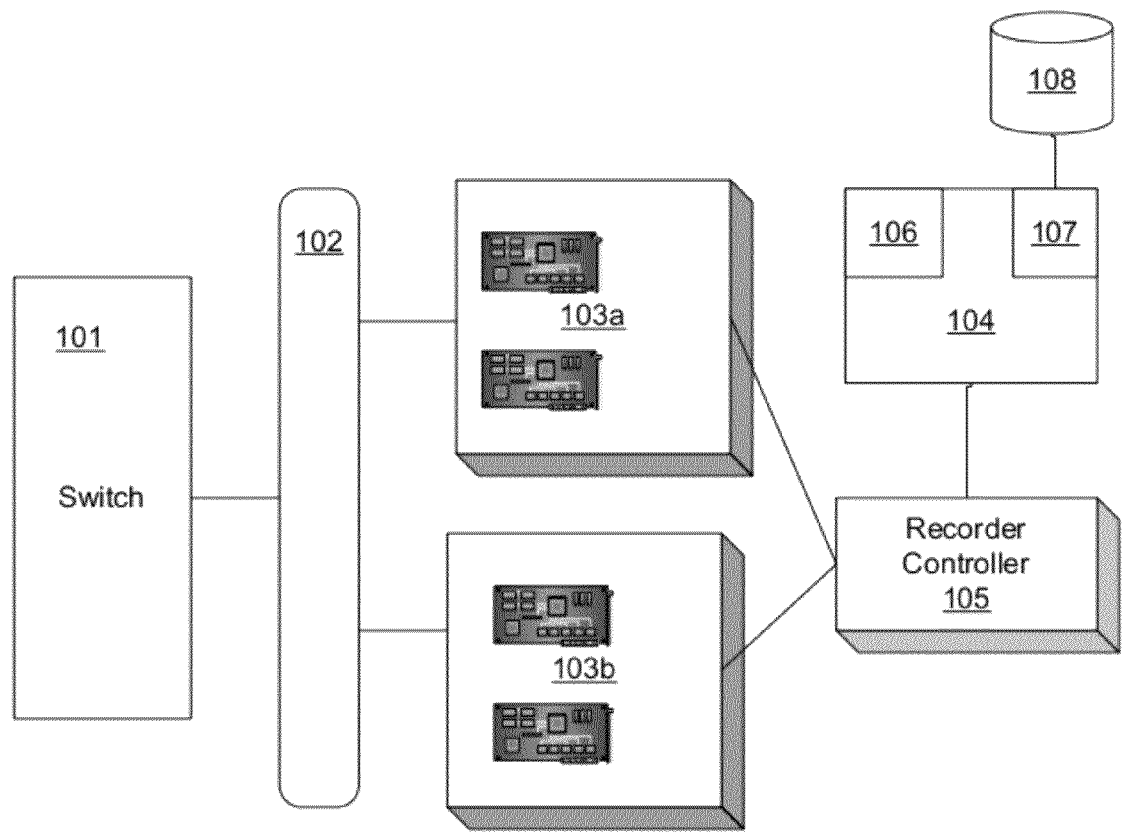
FIG. 1A is a schematic diagram illustrating an exemplary embodiment of an IP recording system.

Referring now in more detail to the figures, FIG. 1A is a systematic diagram of an embodiment of a system in which data originating from the same source in a telephone switch can be recorded by different recorders. Data, such as VoIP, from telephone switch 101 is placed on a computer network 102. Computer network 102 may be any of several networks including an IP network, WAN, LAN or VLAN. As not all data is required by each recorder 103, the recorder controller 105 tells the network adapter (NIC) in each recorder 103 to listen according to its interpretation of the telephone switch configuration 104. The telephone switch configuration 104 includes a Computer Telephony Integration (CTI) service 106 and a CTI database interface 107 for connecting to a CTI database 108. Data originating from the same source in the telephone switch 101 can be recorded by different recorders 103a-b. This concept provides failover and load balancing recording capabilities.

Figure 1B:
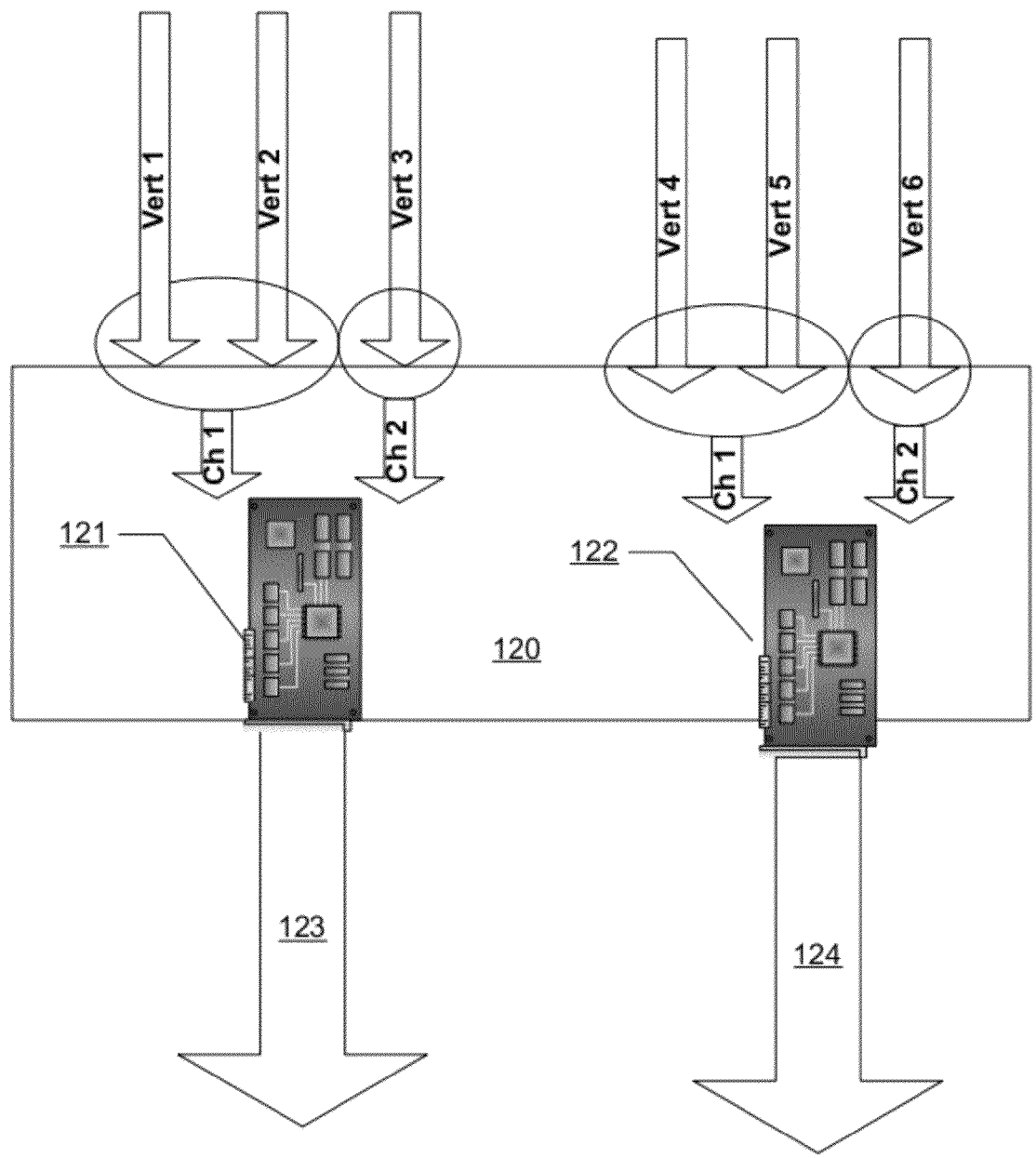
FIG. 1B is a schematic diagram illustrating an exemplary IP interface used to enable IP communication with interfaces.

FIG. 1B is a schematic diagram of an embodiment of the telephone switch 101 in FIG. 1A. The Verts 1-6 are lines where audio input, such as handsets, speakers and intercoms are connected, mixed and organized by the TDM interface card 121 (e.g., PCM32 card) and IP interface card 122. In an embodiment, the switch 120 provides both TDM and IP outputs. In an example of such embodiment, Verts 1-3 are mixed and organized into TDM output channels 123, for example up to 32 channels, and Verts 4-6 are mixed and organized into a recorder interface 124. In one embodiment, the recorder interface 124 may comprise an interface grouping of one or more real-time protocol (RTP) streams. An example of an RTP stream includes PCM32 over RTP. However, it is noted that TDM outputs are not necessary for the IP recording systems disclosed herein.

The IP interface card 122 is used to enable IP communication on the telephone switch 101 by providing IP streams that are delivered actively to the recorder 103. In an embodiment, the IP interface card 122 is an IPSI (PWE3) card, and each card may have one or more recorder interfaces 124 that it serves. A single system 100 may have one or more IP interface cards 122 that are designated for providing voice to recorders 103a, 103b. In an embodiment, the IP streams provided by the IPSI card are a listen only conference on the handset/speaker and intercom channels with both call parties being mixed into a single audio stream. These conferences are done by the switch and are configured using a management client. In an exemplary system, these conferences can be output individually or mixed using ratios, for example, up to 16:1 optimizing the number of recording channels needed. However, better quality recording is achieved with reduced mixing.

In another exemplary embodiment, the outputs to each recorder 103 are combined into groups of up to 32 channels, with each group of 32 channels representing an IP trunk. Each trunk is connected over an IP network to each recorder 103 by IP interface cards 122. Each recorder 103 can support multiple IP trunks.

In an embodiment, recorder hosts may not be configured to know which interfaces (e.g., interface 124) it must record. Instead the recorder controller 105 connects to the telephone service configuration 104. This identifies all available interfaces in the system and allows the recorder controller to evenly distribute them among connected recorder hosts.

The information required by each recorder 103 to correlate and tag recordings with users and their calls is provided via CTI service 106. Static information, such as channel mappings, users' logons and line identities, etc. are accessed using the CTI database interface 107 to CTI database 108.

In addition to the CTI information to identify calls, each recorder 103 may also use voice detection, or VOX, to identify actual voice. In such an embodiment, the recorder 103 uses a combination of VOX recording and a CTI overlay database to capture and fully tag recordings for both TDM and IP recording. All channels connected to the recorder 103 will automatically detect the presence of audio using VOX detect. The audio is captured and stored in files and an index file is created detailing the metadata associate with the recording such as the date, time, channel and duration. These indexes are consolidated to the CTI database 108. The recorder 103 runs VOX detect on the recording channels to capture the audio. Silence is discarded resulting in the optimization of the storage media. The recorder controller 105 interfaces to the telephone switch configuration 104, the CTI feed from telephone switch 101, and processes the CTI data, creating a series of records based on user activities and device activities such that recording segments can be associated with one or more users or device activities.

The recorder controller 105 is used to manage the recorders 103, and in IP recording, it allocates which IP trunks are connected to which recorder 103. This flexibility allows the IP recording solution to operate as a pool of channels across multiple recorders 103a, 103b that can be allocated when the IP trunks come on line and therefore these can be properly load balanced across multiple recorders. If a recorder goes off-line or fails then recorder controller 105 reallocates the failed recorders IP Trunks across the remaining recorders.

The recorder controller 105 interfaces to the telephone switch configuration 104, the CTI feed 106 from the telephone switch 101, and processes the CTI data, creating database records which are representative of activity on user communication devices and is stored directly into the database.

The recorder 103 may also include a routiner, which is a feature of the recorder 103 that can control the switch to detect which pipes are connected to which channels on the recorder 103 and maps these accordingly. It does this by taking control of the handsets via the telephone switch configuration 104 client and making recordings. The routiner analyzes these and can deduce which pipes are connected to which channels on the recorder 103. The recorder can be manually configured to map the pipes to the recorder channels by disabling the routiner.

The routiner can be scheduled to run at a specific time or can be run immediately. Immediately running the routiner will result in a warning to the user that user communication devices should not be used by users before being allowed to proceed and should only be used outside of normal business hours. A detail discussion of mapping of channels in a recording environment can be found in U.S. patent application Ser. No. 11/693,933, entitled "Systems and Methods for Recording Resource Associated in a Recording Environment," filed on Mar. 30, 2007, which is incorporated by reference herein in its entirety.

As discussed above, in a non-limiting example, each interface grouping 124 may have up to 32 multiplexed channels on it. These channels are collectively called the Trunk Index and the audio for them may be sent as PWE3 over TCP/IP on a Voice Recording LAN. This is an example of the telephone switch 101 sending audio data onto the computer network 102 in FIG. 1.

Figure 2:
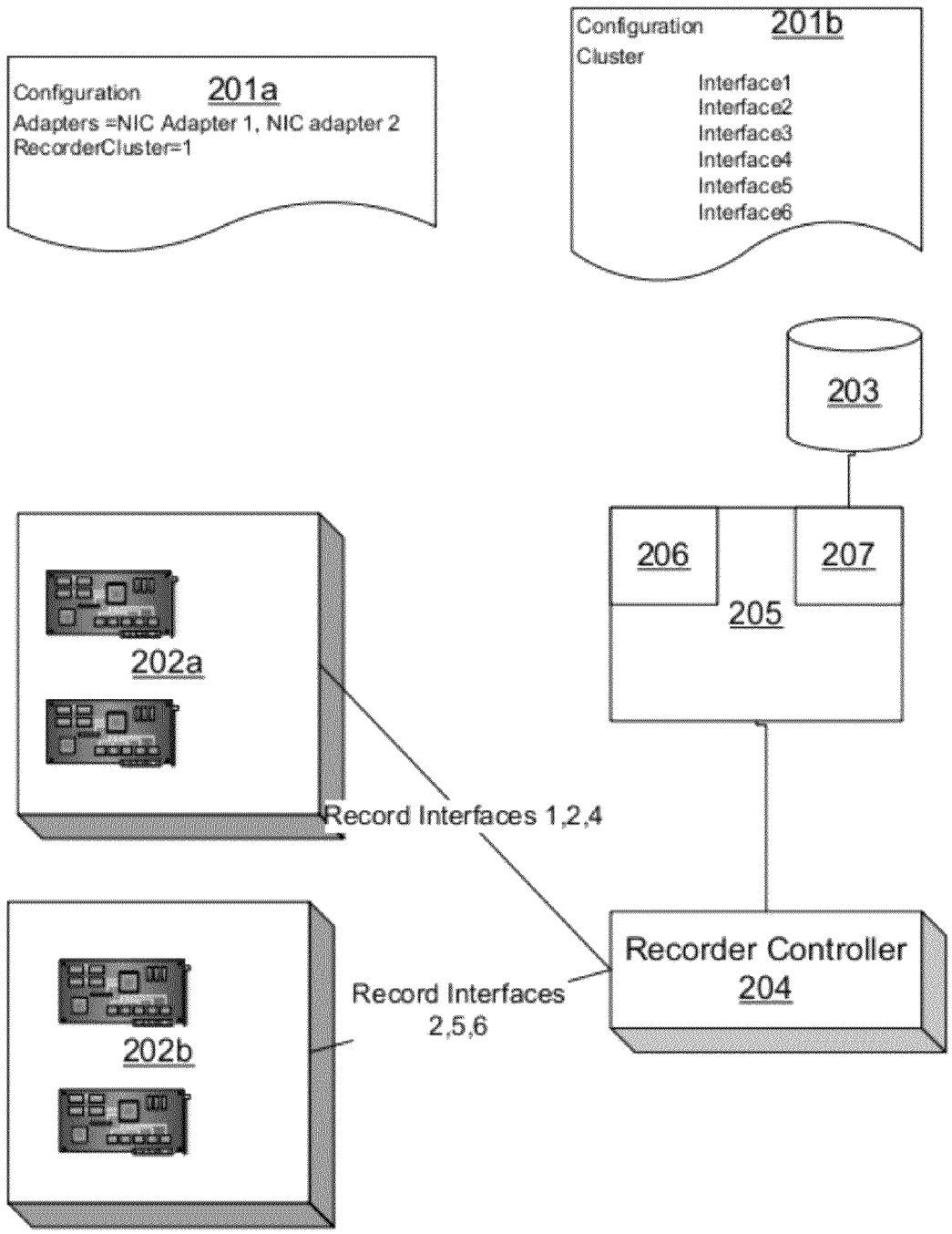
FIG. 2 is a schematic diagram illustrating an exemplary interface diagram.

FIG. 2 is an illustration of a distribution of interfaces on recorders. In an embodiment the interfaces comprise one or more RTP streams, for example, PCM32 over RTP. The interfaces contain a Recorder Cluster number in the configuration 201a. The Recorder Cluster is the set of recorder hosts that can be configured to record the interface.

When a user logs on, the interface that is associated with the communication device of the user is made available through the CTI database 203 (via the CTI data interface on switch configuration 205) to the recorder controller 204. This instructs a recorder in the Recorder Cluster to record the channels from the Voice Recording LAN. This is the same as the recorder controller 204 sending Record Control Commands to the recorders 202a-b.

When a user logs off, the recorder controller 204 instructs the recorder 202 to stop recording. As the interface is associated with a single communication device, the system also works in a freeseating environment, where users may log on at any position and the same functionality of the system is expected. Further in a freeseating environment, the system is configured to allow only specified users to be recorded. The users can sit at any seat. With no free seating, the users are allocated specific seats which are always recorded.

For the IP interface used in the current invention, an N+M type redundancy can be used to reduce the hardware footprint of the solution, where M could be equal to one or more extra recorders. For illustration purposes, N+1 redundancy means that enough spare channels are provided to continue recording, if at most, one recorder fails. N+2 would mean that enough spare channels are provided should two recorders fail, and so on. Thus, if two recorders fail in an N+1 solution, then all recording for one recorder would be lost.

Figure 3:
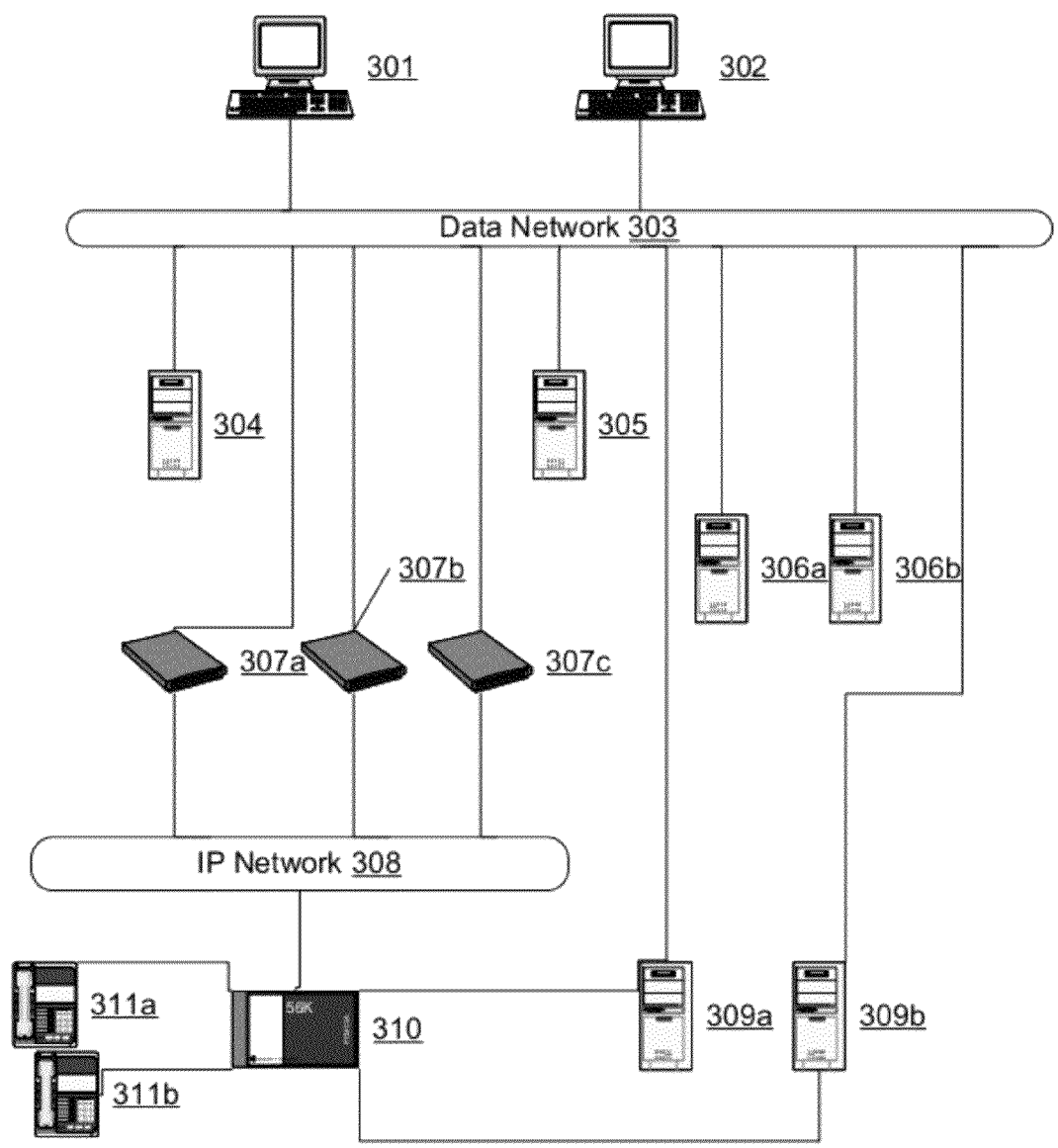
FIG. 3 is a schematic diagram illustrating an exemplary fault tolerant and load balancing system for IP recording.

FIG. 3 is a systematic diagram of an exemplary IP recording system 300 deployed in fault tolerant redundancy and/or load balancing. In this non-limiting example, three recorders 307a, 307b and 307c are used for IP recording of communications. However, it should be noted an IP recording system can have any number of recorders. Switch 310 routes communications to communication devices 311a-b and IP network 308. Switch 310 uses IP interfaces to place data onto the IP network 308 via IP trunks. Switch 310 may also include TDM interfaces to provide TDM outputs. The three recorders 307a, 307b and 307c are connected to IP network 308 via IP trunks.

IP recording system 300 also includes recorder controllers 306a and 306b, switch configuration servers 309a and 309b, an application server 304, an archive server 305, a system administrator 301 and a user 302. In this non-limiting example, recorder controller 306a and switch configuration server 309a are primary units, and recorder controller 306b and switch configuration server 309b are in standby mode. Switch configuration servers 309 are communicatively coupled to switch 310 and data network 303. Data network 303 may be any of several networks including a WAN, LAN, wireless network, or Internet. System administrator 301 and user 302 are connected to application server 304, recorders 307a-c, archive server 305, recorder controllers 306a-b and switch configuration servers 309a-b via data network 303. It should be noted that the system 300 is not limited to a pair of recorder controllers 306a and 306b. The pair of recorder controllers is only one example of redundancy of the recorder controllers, and the system 300 could have more than two recorder controllers. Likewise, it is not a requirement for system 300 to have two recorder controllers in order to have recording interface distribution.

In a redundant solution the recording channels are distributed across a set of recorders (e.g., 307a, 307b and 307c). In an embodiment, the system 300 is designed such that if any recorder 307 fails then there is enough channel capacity in the remaining recorders to record the failed recorder channels. The system 300 can detect if a recorder 307 fails then dynamically under software control in recorder controller 306 route IP trunks from the failed recorders to the remaining recorders. The recorder controller 306 is the application that monitors the health of the recorders and should one fail it will instruct the other recorders to start recording the channels that were on the failed recorder.

In another exemplary embodiment, the system 300 is designed such that if the load on any recorder 307 is substantially unbalanced, the system 300 can detect the recorder 307 (or recorders) with the unbalanced load then dynamically under software control in recorder controller 306 redistribute recording interfaces among the active recorders to substantially balance the load on all active recorders. Load balancing may be based on any number of algorithms. For example, it may be based on active recording at a moment in time. Load balancing algorithms may also be based on hard usage on the recorder, geographical proximity to the source, or maintenance mode where a recorder is gracefully taken off line. The system 300 performs active load balancing based on actively instructing the switch where to send a recording interface. Additional discussion on load balancing in a recording environment can be found in U.S. patent application Ser. No. 11/395,497, entitled "Passive Recording Load Balancer," filed on Mar. 31, 2006, which is incorporated by reference herein in its entirety.

The switch configuration servers 309a-b and the recorder controllers 306 are paired together, and in fault tolerant mode there is a primary and standby pair of servers. The recorder controllers 306a-b continually heartbeat each other across the data network 303, and if the primary recorder controller 306a fails then the standby recorder controller 306b will become operational and take control of the recorders 307a-c. In an embodiment, the primary recorder controller 306a is connected to the primary switch configuration server 309a via data network 303. If a failure occurs, then the standby recorder controller 306b will take over and will use the standby switch configuration server 309b.

Figure 4:
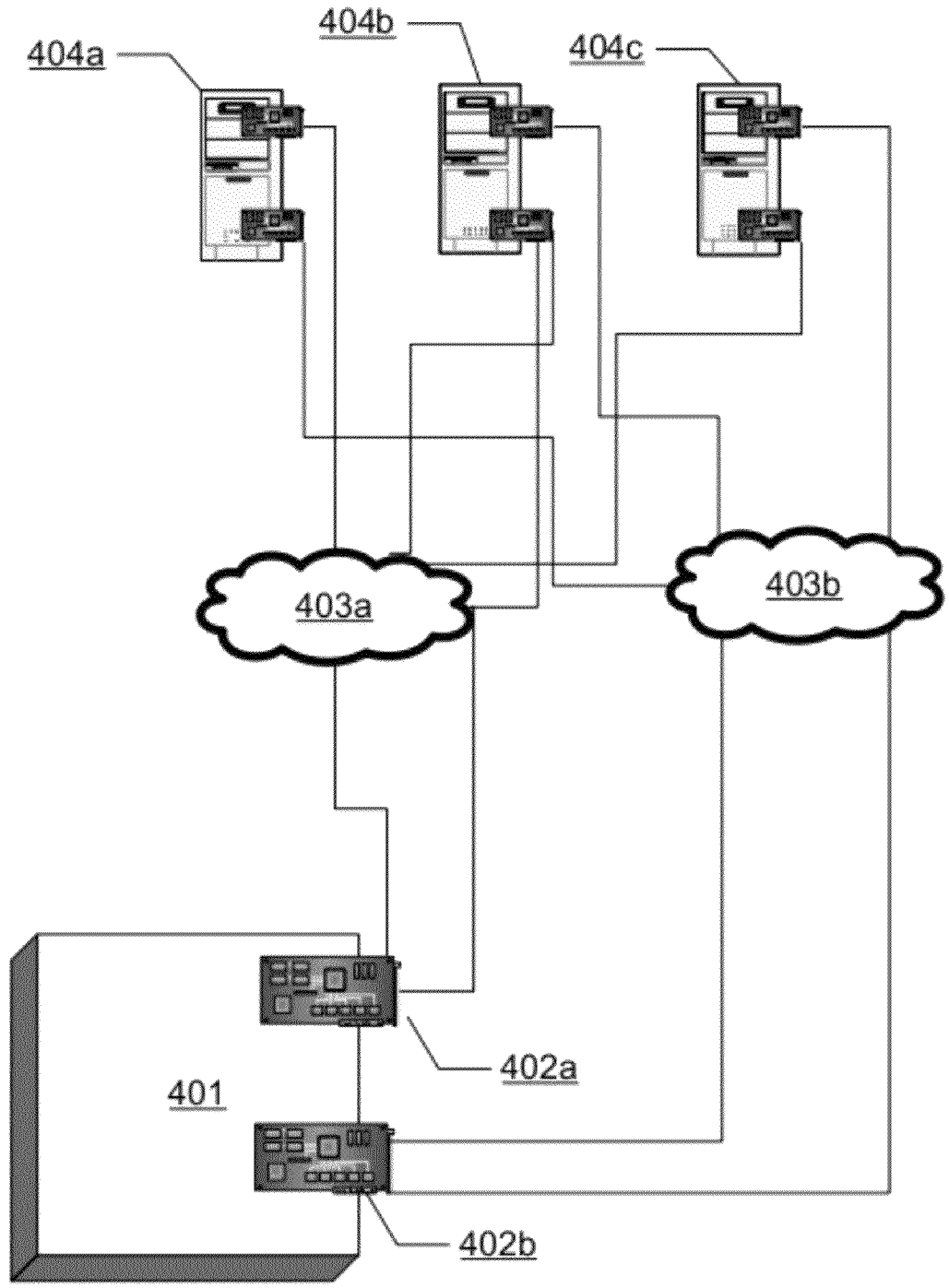
FIG. 4 is a schematic diagram illustrating an exemplary VLAN network redundancy.

FIG. 4 is a systematic diagram of an exemplary design a dedicated separate Virtual LAN (VLAN) with a backup VLAN to provide load balancing and fault tolerance. The duplicate VLANs 403a-b connect each recorder 404 with dual NIC cards to the switch 401 via dual IP interface cards 402a-b (e.g., IPSI cards). Each network connection is independently monitored by the IP interface card 402 and if it detects a failure it can switch its IP trunks to the backup VLAN. The VLANS 403a-b can work independently of each other, so a failure on one recorder's NIC card 405 will only require the affected recorder 404 to switch to the backup VLAN, allowing the other recorders to continue to operate normally. Failure of the NIC cards 405 or the IP interface cards 402 may result in alarms.

Figure 5:
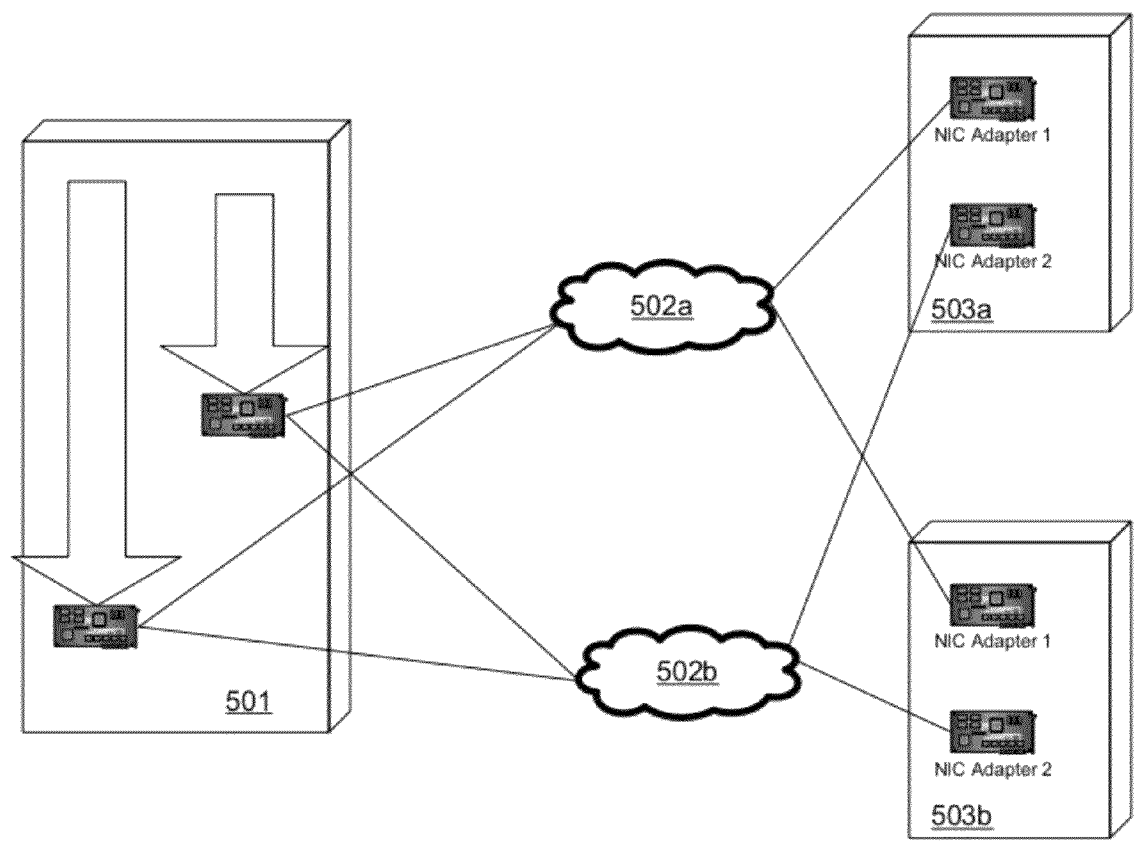
FIG. 5 is a schematic diagram illustrating an exemplary distribution of interfaces on recorders.

FIG. 5 is an exemplary recorder interface diagram. The N+1 solution can be used to provide load balancing and fault tolerant capability to the recording system. For recorder failure, it requires that recording system detect when one of the recorder nodes is no longer able to record. This will be achieved via a pinging mechanism between all of the recorders 503. Each recorder 503 will need the host name of all other recorders. In an embodiment, the pinging is done via two independent VLANs 502a and 502b to ensure that the spare does not falsely detect a loss of recording due to a problem with pinging and cause a switchover to occur even though all other recorders are functioning properly. The system can also detect when a failed recorder is back, and thus, bring the recorder back online, moving interfaces back to the recorder and again running all recorders at a further reduced capacity. In an embodiment, the system may load the recorder that has been brought back online more heavily since its hard disk has not been used to the same load as the other recorders that have remained up.

Similarly, the recording system can also detect when one or more of the recorders' loads are not balanced. Load balancing is achieved by the recorder controller tracking which interfaces it has allocated to each recorder and the number of available licensed recording channels on each recorder. The recorder controller periodically checks this configuration (bearing in mind that interfaces may be relocated in the interim due to recorder failure) and redistributes interfaces appropriately.

If a recorder 503 loses its ability to record one or more interfaces output from switch 501 it will signal via the pinging mechanism so that the recorder controller will re-distribute the interface to another recorder. Likewise, recorder controller can determine if a recorder recording load is lighter or heavier than other recorders, and the recorder controller can re-distribute the interfaces to one or more other recorders to balance the load on all recorders.

Figure 6:
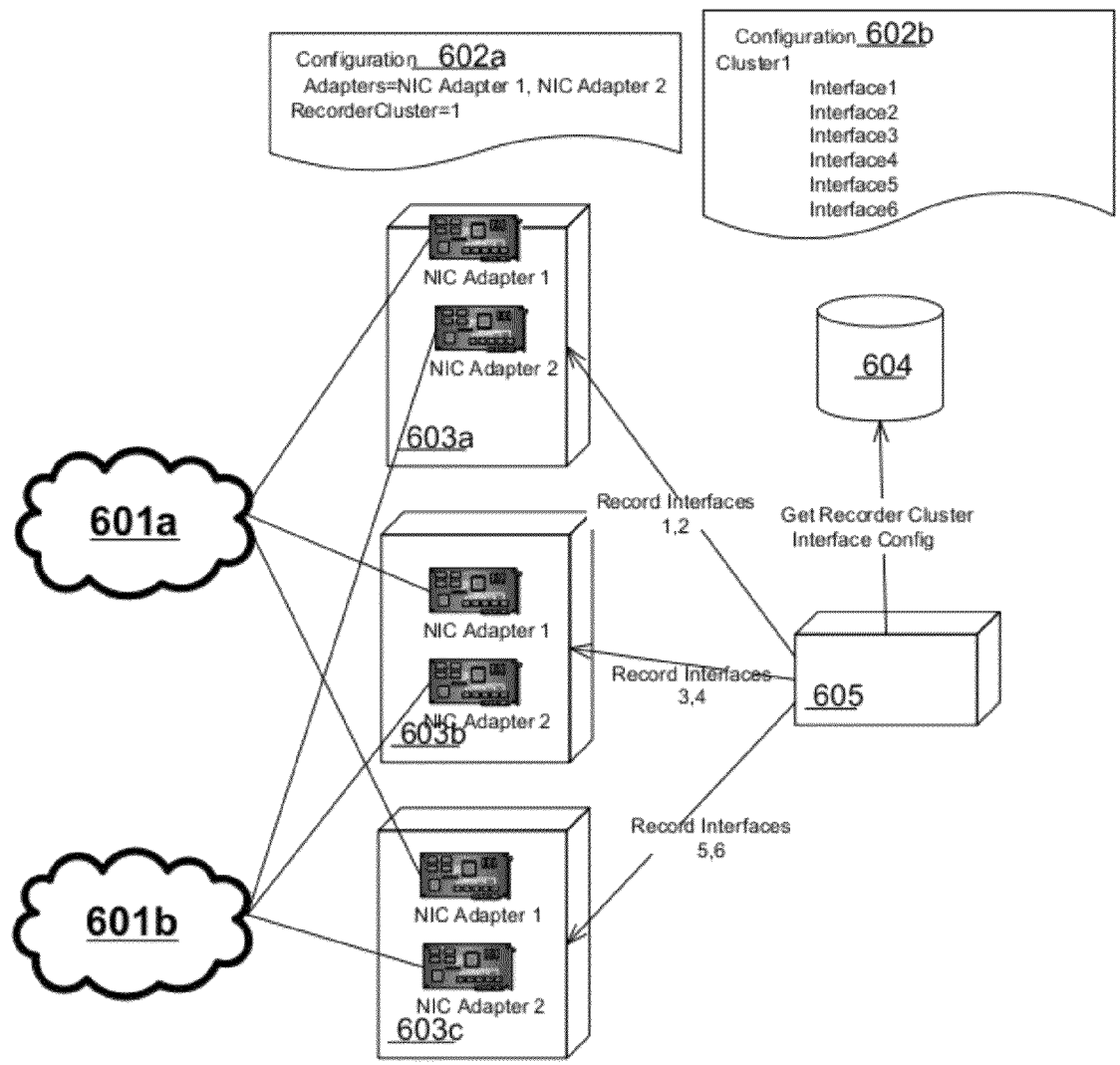
FIG. 6 is a schematic diagram illustrating an exemplary N+1 solution with three active recorders.

FIG. 6 shows an exemplary N+1 solution where six interfaces (e.g., RTP streams) are distributed over three recorders 603a-c. In this non-limiting example, each recorder 603 is sized to handle three interfaces, meaning each recorder can handle one extra interface. The recorder controller 605 obtains the list of interfaces from the CTI database 604 and evenly distributes them among the three recorders 603a-c.

The recorders are grouped together as a cluster so the recorder controller 605 knows which interfaces to distribute to a given set of recorders 603. An example of cluster selection for distribution is based on location and proximity.

Although an N+1 solution is illustrated as examples in the figures, it is noted that the invention disclosed herein is not limited to an N+1 solution. In particular, as discussed above, an N+M type redundancy can be used to reduce the hardware footprint of the solution, where M could be equal to one or more extra recorders. Thus any number (M) of spare recorders can be used to provided redundancy in the present invention.

Figure 7:
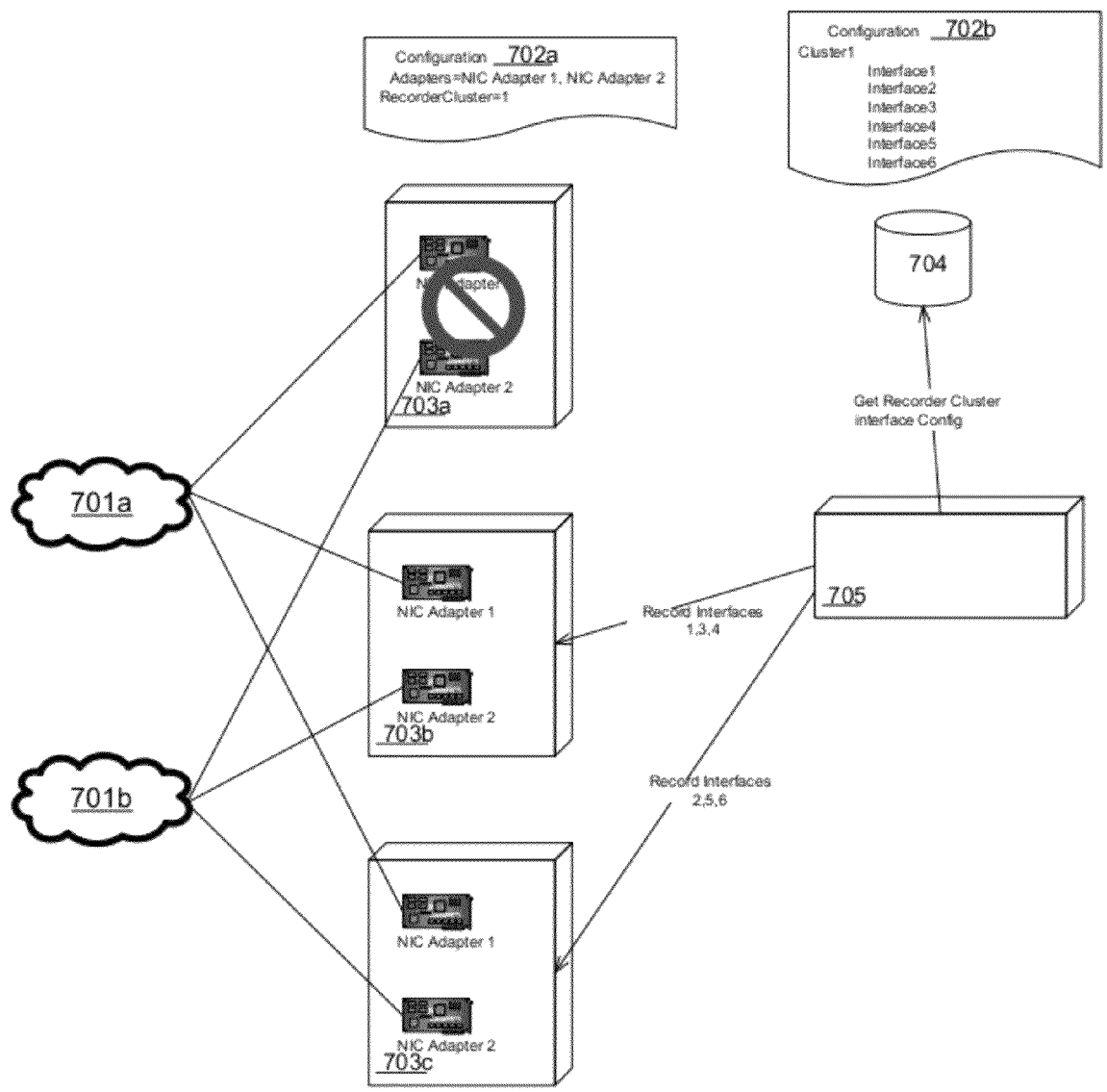
FIG. 7 is a schematic diagram illustrating an exemplary N+1 solution with one recorder down.

FIG. 7 shows the same N+1 solution after one of the recorders fails, in this case, recorder 703a. The recorder controller 705 automatically redistributes interfaces 1 and 2 to recorders 703b and 803c to compensate for the loss of recorder 703a.

Figure 8:
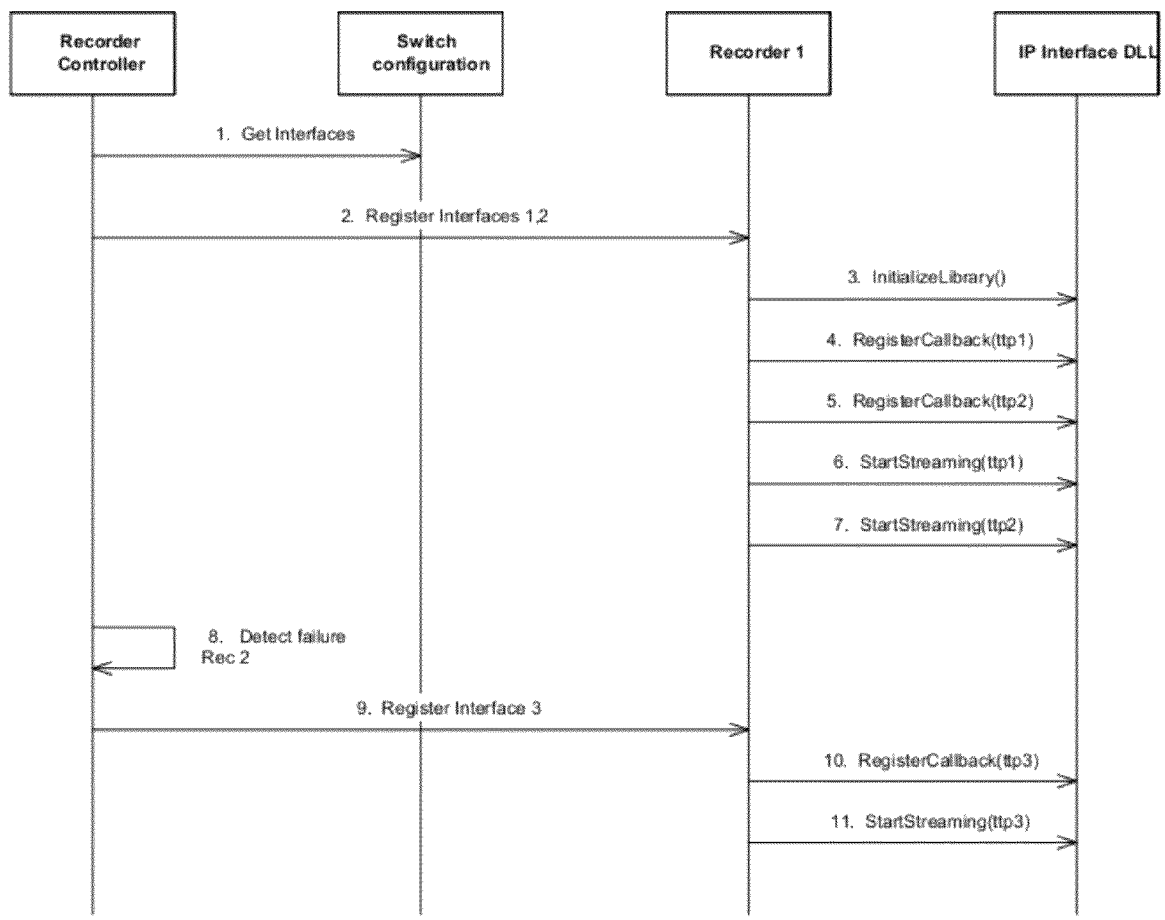
FIG. 8 is a sequence diagram illustrating exemplary API calls for a failover sequence.

FIG. 8, with reference to FIG. 7, is a sequence diagram of programming API calls that takes place when one of the recorders fails and another has to take over.
1. Recorder controller 705 queries interfaces from switch configuration information.
2. Recorder controller 705 signals Recorder 1 to register interfaces 1 and 2.
3-7. Recorder 703a Initializes Library and execute RegisterCallback and StartStreaming for interfaces 1 and 2.
8. Recorder controller 705 detects failure of another recorder 803. Recorder controller 705 can also check to determine if the interfaces are evenly distributed across the recorders for load balancing.
9. Recorder controller 705 signals to recorder 803a to register from interface 3.
10-11. Recorder 703a executes RegisterCallback and StartStreaming for interface 3.

Figure 9:
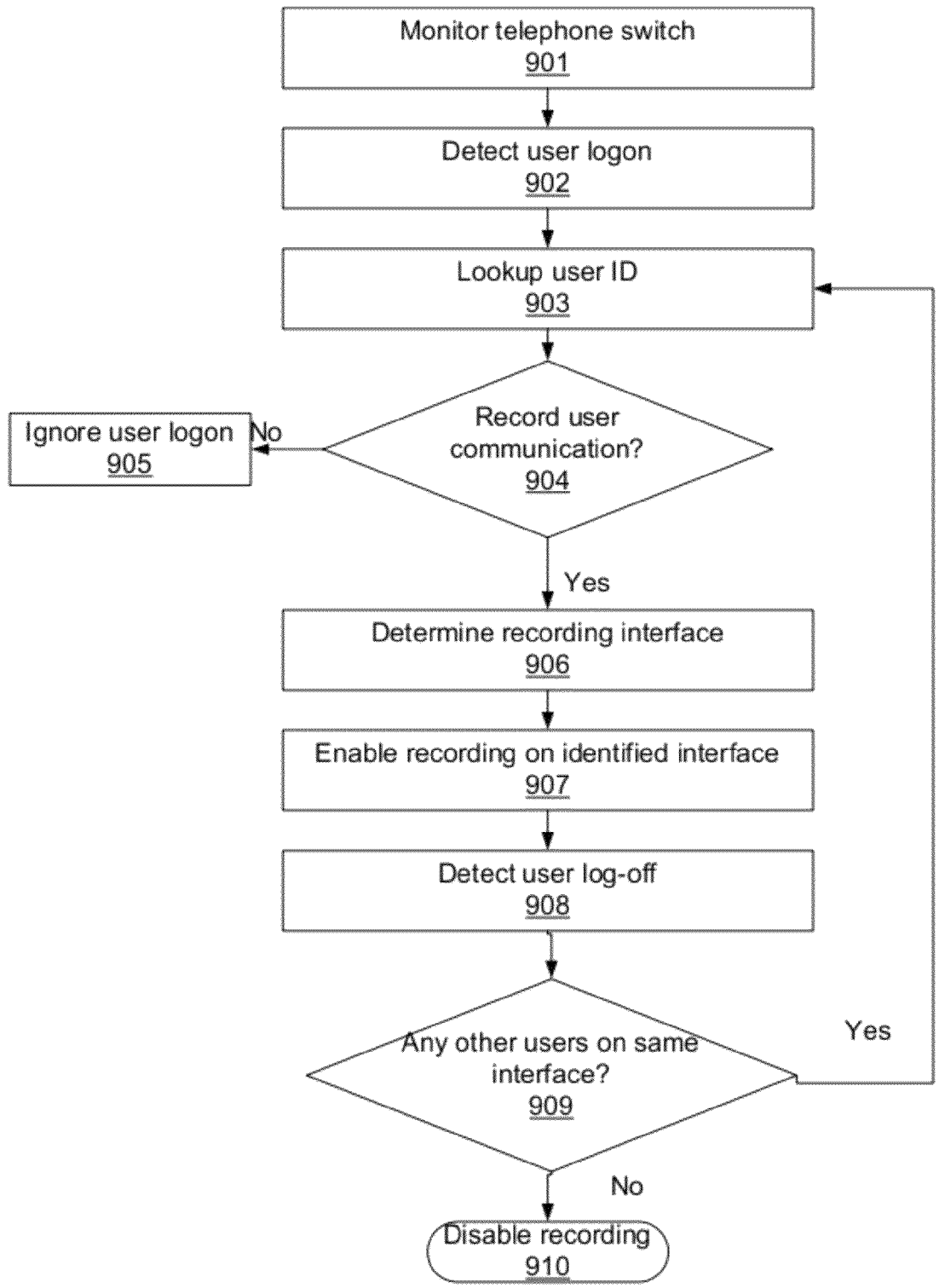
FIG. 9 is a flowchart illustrating exemplary steps that can be taken to record IP communication.

FIG. 9 is a flowchart illustrating exemplary steps that can be taken to monitor and record IP communication in accordance with system 100. In the non-limiting example of FIG. 9, the recorder controller 105 monitors the telephone switch 101 (block 901). The recorder controller 105 detects when a user logs on (block 902), and recorder controller 105 lookups the user ID from the switch configuration 104 to determine if the communication associate with the user should be recorded (block 903). If the user ID from the switch configuration 104 indicates that the user communication should not be recorder, the user log on is ignored for purposes of recording (blocks 904 and 905). If the user communication should be recorded, the system determines the recording interface the user is on and the interface that is associated with the communication device of the user is made available through the telephone switch configuration 104, and the recorder controller 105 assigns the interface to a recorder (for example 103a) (blocks 904 and 906). This instructs the recorder 103a to enable recording on the identified interface from the IP network 102 (block 907). When the recorder controller 105 detects that the user has logged off, the recorder controller 105 determines if there are any other users on the same interface (blocks 908, 909). If not, the recorder controller 105 disable recording on the interface (block 910). Otherwise, the recorder controllers 105 looks up the ID of the user that is logged on the same interface and the process loops back to step 903 and continues as described above. Multiple users may be logged on the same interface, and thus, the recorder may record multiple user communications on an interface.

Further, the recording system can detect if there is a user to be recorded and a user not to be recorded within the same recording interface to ensure that the user not to be recorded does not have his/her session recorded. In another embodiment, if the communication related to user not to be recorded is recorded, the system will delete such recording or the recording may be masked to ensure it is not playable.

In another exemplary embodiment, the recording system determines if there are users not to be recorded on the same interface, and if there are such users, the recording system may either explicitly not record those communication streams within the interface, or record them and then delete them after the communication session is complete and the system determines that the communication streams are not required.

Figure 10:
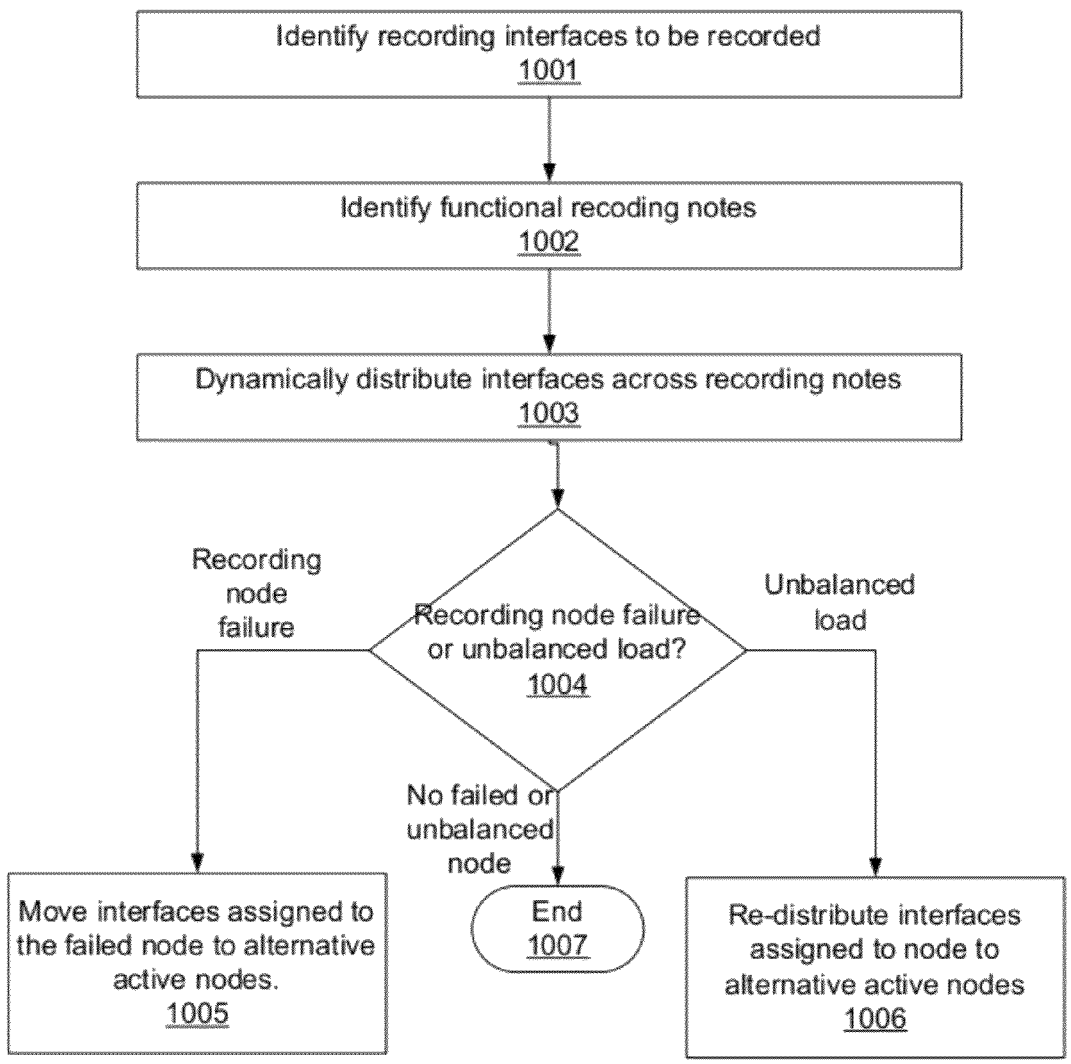
FIG. 10 is a flowchart illustrating exemplary steps that can be taken to enable fault tolerant redundancy and load balancing.

FIG. 10 is a flowchart illustrating exemplary steps that can be taken to monitor for load balancing and fault tolerant IP recording in accordance with the exemplary system in FIG. 7. Recorder controller 705 identifies recording interfaces to be recorded (e.g., recorders 703a-c) (block 1001). The recorder controller 705 identifies functional recording nodes and dynamically distributes interfaces across the recording nodes (blocks 1002 and 1003). The recorder controller 705 determines if any recording node fails or if the recording load is unbalanced (block 1004). The recorder controller 705 can identify node failure or unbalanced load through a pinging mechanism. The pinging can be done via a VLAN. In an embodiment, the pinging is done via a two independent VLANs 701a-b to ensure that the spare does not falsely detect a loss of recording or an uneven load due to problem with pinging and cause a switchover to occur even though all other recorders are functioning properly. If a recording node failures (e.g., on recorder 703*a*), recorder 703*a* will signal via the pinging mechanism so that the recorder controller will move the interfaces assigned to that node to alternative active nodes (blocks 1004 and 1005). Likewise, recorder controller 705 can determine from the pinging mechanism if a recorder (e.g., recorder 703*a*) recording load is substantially unbalanced with respect to the other recorders, and the recorder controller can re-distribute the interfaces assigned to that recording node to one or more other recorders to balance the load on recorder 703*a* (blocks 1004 and 1006). In an embodiment, node distribution is done on a least usage basis to ensure substantially even usage. Node distribution may also be based on available hard space on the nodes to ensure that call retention periods are being met. Extra capacity recorders are used to ensure that the failover units are working. If there are no node failures or unbalanced load, then no redistribution or rerouting of the interfaces assigned to a node needs to be done (block 1007).

An exemplary application of the systems and methods disclosed herein is for IP recording in a trading system, such as a trading system commercially available from British Telecommunications plc, the BT Trading System. In such systems, the BT MegaLink switch provides both PCM32 channel output and interface output (via an IPSI card). The IPSI card communicates between the trading system and the IP-based turrets or recorders. The recorder interface represents a virtual PCM32 trunk for IP recording. The telephone switch configuration is handled by the BT ITS Link server and LDAP database. When a trader logs on, the interface that is associated with that turret is made available through LDAP to the recorder controller. This instructs a Recorder in the Recorder Cluster to record the channels in the Trunk Index from the Voice Recording LAN. When a trader logs off, the recorder controller instructs the recorder to stop recording.

One should note that the flowcharts and sequence diagrams included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts or sequence diagrams), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure and are not meant to limit the scope of the invention. The scope of the invention is to be limited only by the following claims. From the above discussion, many variations will be apparent to one skilled in the relevant art that would yet be encompassed by the spirit and scope of the invention. All such modifications and variations are intended to be included herein within the scope of this disclosure.

The invention claimed is:

1. A method for selectively recording IP telephony, comprising;
   detecting a user logon;
   determining if a communication associated with the detected user logon is to be recorded;
   associating a communication device with the user;
   assigning an interface to a recorder associated with the communication device; and
   recording data from the communication device, wherein the data is transmitted over the interface to the recorder.

2. The method of claim 1, wherein the interface comprises one or more RTP streams.

3. The method of claim 1 further comprising:
   detecting whether the user has logged off;
   determining whether at least one other user is on the same interface;
   determining whether a communication associated with the at least one other user is to be recorded; and
   recording data from a communication device associated with the at least one other user, wherein the data is transmitted over the interface to the recorder.

4. The method of claim 1, wherein a user not to be recorded shares the same recording interface as the user to be recorded.

5. The method of claim 1 further comprising:
   deleting a recording of communication related to a user not to be recorded.

6. The method of claim 1, wherein a set of static information is accessed using the interface from the CTI database.

7. The method of claim 1, wherein the recorder stops recording when the user logs off.

8. The method of claim 1, wherein the recording is done in a freeseating environment.

9. The method of claim 1 further comprising:
   detecting a recorder failure, wherein said detecting comprises pinging the recorder and receiving an indication via the pinging that the recorder has failed; and
   dynamically routing an interface associated with the failed recorder to at least one other recorder, wherein the at least one other recorder records data from the interface associated with the failed recorder.

10. The method of claim 1 further comprising:
    detecting a substantially unbalanced load on a recorder, wherein said detecting comprises analyzing an existing interface allocation; and
    dynamically routing a interface associated with the unbalanced recorder to at least one other recorder, wherein the at least one other recorder records data from the interface associated with the unbalanced recorder.

11. A system for selectively recording IP telephony, comprising;
a recorder controller being operative to detect a user logon;
a switch configuration having user IDs, wherein the recorder controller lookups the detected user logon ID of the user to determine if a communication associated with the user is to be recorded; and
a communication device associated with the user, wherein the switch configuration assigns an interface to a recorder associated with the communication device, and wherein the recorder records data from the communication device, the data being transmitted over the interface to the recorder.

12. The system of claim 11, wherein the interface comprises one or more RTP streams.

13. The system of claim 11, wherein:
the recorder controller detects whether the user has logged off;
the recorder controller lookups the user ID of at least one other user on the same interface to determine if a communication associated with the at least one other user is to be recorded; and
the recorder records data from a communication device associated with the at least one other user, wherein the data is transmitted over the interface to the recorder.

14. The system of claim 11, wherein a user not to be recorded shares the same recording interface as the user to be recorded.

15. The system of claim 11, wherein the recorder controller deletes a recording of communication related to a user not to be recorded.

16. The system of claim 11, wherein the interface is obtained from the CTI database.

17. The system of claim 11, wherein the recorder stops recording when the user logs off.

18. The system of claim 11, wherein the recording is done in a freeseating environment.

19. The system of claim 11, wherein:
the recorder controller detects a recorder failure by pinging the recorder and receiving an indication via the pinging that the recorder has failed; and
the recorder controller dynamically routes an interface associated with the failed recorder to at least one other recorder, wherein the at least one other recorder records data from the interface associated with the failed recorder.

20. The system of claim 11, wherein:
the recorder controller detects a substantially unbalanced load on a recorder by analyzing an existing interface allocation; and
the recorder controller dynamically routes a interface associated with the unbalanced recorder to at least one other recorder, wherein the at least one other recorder records data from the interface associated with the unbalanced recorder.

* * * * *